(12) United States Patent
Hausmann et al.

(10) Patent No.: US 11,993,393 B2
(45) Date of Patent: *May 28, 2024

(54) FLIGHT GUIDANCE PANELS WITH JOYSTICK CONTROLS

(71) Applicant: Gulfstream Aerospace Corporation, Savannah, GA (US)

(72) Inventors: Jeffrey Hausmann, Savannah, GA (US); Kristin Medin, Savannah, GA (US); Jim Jordan, Savannah, GA (US); Scott Bohanan, Savannah, GA (US)

(73) Assignee: GULFSTREAM AEROSPACE CORPORATION, Savannah, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/297,114

(22) Filed: Apr. 7, 2023

(65) Prior Publication Data

US 2023/0242272 A1      Aug. 3, 2023

Related U.S. Application Data

(63) Continuation of application No. 16/947,281, filed on Jul. 27, 2020, now Pat. No. 11,649,066.

(Continued)

(51) Int. Cl.
*B64D 43/00* (2006.01)
*B64C 13/04* (2006.01)
*B64D 11/06* (2006.01)

(52) U.S. Cl.
CPC .......... *B64D 43/00* (2013.01); *B64C 13/0421* (2018.01); *B64D 11/0646* (2014.12); *B64D 11/0689* (2013.01)

(58) Field of Classification Search
CPC ................ B64D 43/00; B64D 11/0646; B64D 11/0689; B64D 43/02; B64C 13/0421; G01C 23/005; G06F 3/013
See application file for complete search history.

(56) References Cited

U.S. PATENT DOCUMENTS 8,761,971 B2 * 6/2014 Gershzohn ............. G05D 1/101
                                                    701/3
2006/0164260 A1 * 7/2006 Berthou ................. B64D 43/00
                                                    340/945

(Continued)

FOREIGN PATENT DOCUMENTS

EP    3412578 A1 * 12/2018 ............. B64D 43/00
EP    3567346 A1 * 11/2019 ............. B64D 43/00

(Continued)

*Primary Examiner* — Assres H Woldemaryam
(74) *Attorney, Agent, or Firm* — Lorenz & Kopf, LLP

(57) ABSTRACT

A flight guidance panel for an aircraft includes a subpanel display, a joystick, rotary encoders, a deflection sensor, and a processor. The subpanel display indicates autopilot modes and flight value goals and has a top-level state and a subpanel control state. The joystick is for user interaction with the subpanel display. The rotary encoder is coupled with the joystick to receive rotation inputs from a user of the joystick. The deflection sensor is coupled with the joystick to detect a deflection input from the user of the joystick. The processor is programmed to: change a state of the subpanel display to the subpanel control state corresponding to a selected subpanel in response to receiving the deflection input while the subpanel display is in the top-level state; and change the flight value goals in response to receiving the rotation inputs while the subpanel display is in the subpanel control state.

20 Claims, 4 Drawing Sheets

Related U.S. Application Data

(60) Provisional application No. 62/883,447, filed on Aug. 6, 2019.

(56) References Cited

U.S. PATENT DOCUMENTS

| | | | | |
|---|---|---|---|---|
| 2007/0008188 | A1* | 1/2007 | Firra | G01D 7/02 |
| | | | | 340/973 |
| 2008/0012730 | A1* | 1/2008 | Soler | G02B 27/01 |
| | | | | 340/980 |
| 2010/0152928 | A1* | 6/2010 | Aymeric | G01C 23/005 |
| | | | | 715/702 |
| 2013/0185668 | A1* | 7/2013 | Martin | G06F 3/0482 |
| | | | | 715/773 |
| 2014/0074325 | A1* | 3/2014 | Nikolic | G01C 23/00 |
| | | | | 701/14 |
| 2015/0081138 | A1* | 3/2015 | Lacko | B64D 45/00 |
| | | | | 701/3 |
| 2016/0185448 | A1* | 6/2016 | Scacchi | B64C 13/22 |
| | | | | 244/197 |
| 2017/0259935 | A1* | 9/2017 | Hausmann | G06F 3/041 |
| 2017/0291716 | A1* | 10/2017 | Buethe | H04N 7/183 |
| 2017/0355467 | A1* | 12/2017 | Rudolph | B64C 13/18 |
| 2019/0265067 | A1* | 8/2019 | Watkins | B60K 37/06 |
| 2019/0344903 | A1* | 11/2019 | Bohanan | G01C 23/005 |
| 2019/0352018 | A1* | 11/2019 | Bohanan | G06F 3/02 |

FOREIGN PATENT DOCUMENTS

| | | | | | |
|---|---|---|---|---|---|
| EP | 3671394 | A1 * | 6/2020 | | B64D 43/00 |
| FR | 3043065 | A1 * | 5/2017 | | |
| GB | 2549271 | A  * | 10/2017 | | B64C 13/04 |

\* cited by examiner

FLIGHT GUIDANCE PANELS WITH JOYSTICK CONTROLS

CROSS-REFERENCE TO RELATED APPLICATIONS

This application is a continuation of U.S. patent application Ser. No. 16/947,281, filed Jul. 27, 2020, which claims the benefit of U.S. provisional patent application No. 62/883,447, filed Aug. 6, 2019, the entire contents of which are herein incorporated by reference.

TECHNICAL FIELD

The present invention generally relates to aircraft flight guidance panels, and more particularly relates to flight guidance panels with joystick user input devices for transport category aircraft.

BACKGROUND

Conventional transport category flight guidance panels have collections of buttons and knobs that permit the crew to choose and engage autopilot modes and functions. A typical flight guidance panel has dedicated subpanels for lateral, speed, vertical, and altitude autopilot navigation modes. Each of these dedicated subpanels has at least one dedicated knob and button to control the modes and values associated with the corresponding guidance. For example, a conventional flight guidance panel may have a dedicated altitude subpanel with a knob to adjust the target altitude value and a button to change modes between autopilot and manual control of the altitude of the aircraft.

One requirement of the layout of these conventional flight guidance panels is visual confirmation that the pilot has selected the correct button or knob. For example, if a pilot wishes to change the altitude mode from autopilot to manual control, the pilot must look at the flight guidance panel to be sure the correct button is actuated.

Another requirement of these conventional flight guidance panels is use of the dedicated knobs and buttons to choose and engage the modes and functions. If a dedicated knob and/or button malfunctions, then the crew may not be able to use the modes and functions of the corresponding subpanel.

These conventional flight guidance panels are also restricted from remotely locating the dedicated knobs and buttons for easier access by the crew. For example, the seats in the flight deck typically slide backward for crew comfort during long trips while the aircraft may be on autopilot in the cruise flight phase. While the seat is back, the flight guidance panel may be unreachable. Accordingly, the crew must lean forward or slide the seat forward to make adjustments to the modes and functions. Remotely locating the dedicated buttons and knobs is not typically feasible because the at least four buttons and four knobs demand a large physical space to occupy. Such a large physical space is typically not available for placement of the dedicated buttons and knobs in a more accessible location.

Accordingly, it is desirable to provide flight guidance panels with improved controls. Furthermore, other desirable features and parameters of the present invention will become apparent from the subsequent detailed description of the invention and the appended claims, taken in conjunction with the accompanying drawings and this background of the invention.

BRIEF SUMMARY

Various non-limiting embodiments of flight guidance panels and aircraft are disclosed herein.

In a first non-limiting embodiment, a flight guidance panel for an aircraft includes a subpanel display, a joystick, rotary encoders, a deflection sensor, and a processor. The subpanel display indicates autopilot modes and flight value goals and has a top-level state and a subpanel control state. The joystick is for user interaction with the subpanel display. The rotary encoder is coupled with the joystick to receive rotation inputs from a user of the joystick. The deflection sensor is coupled with the joystick to detect a deflection input from the user of the joystick. The processor is programmed to: change a state of the subpanel display to the subpanel control state corresponding to a selected subpanel in response to receiving the deflection input while the subpanel display is in the top-level state; and change the flight value goals in response to receiving the rotation inputs while the subpanel display is in the subpanel control state.

In a second non-limiting embodiment, an aircraft includes a flight guidance panel and a processor. The flight guidance panel includes a subpanel display, a joystick, rotary encoders, and a deflection sensor. The subpanel display indicates autopilot modes and flight value goals and has a top-level state and a subpanel control state. The joystick is for user interaction with the subpanel display. The rotary encoder is coupled with the joystick to receive rotation inputs from a user of the joystick. The deflection sensor is coupled with the joystick to detect a deflection input from the user of the joystick. The processor is programmed to: change a state of the subpanel display to the subpanel control state corresponding to a selected subpanel in response to receiving the deflection input while the subpanel display is in the top-level state; and change the flight value goals in response to receiving the rotation inputs while the subpanel display is in the subpanel control state.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Flight Guidance Panels (FGPs) described herein generally include a joystick input device for a pilot and a joystick input device for a co-pilot of an aircraft. Subpanels of the FGP may be selected by deflection of either joystick while the FGP is in a top-level state or menu to place the FGP in a subpanel control state associated with the selected subpanel.

While in the subpanel control state, the joystick may be deflected to change the autopilot modes, functions, or units displayed. The joystick may additionally be rotated to adjust the flight value goals (e.g., altitude, speed, etc.) associated with the selected subpanel. The FGP may return to the top-level state in response to pressing a return button. The joysticks may be disposed in a housing of the FGP and/or may be remotely located (e.g., in an armrest of a seat in the flight deck). The joystick controls described herein permit a crew member to perform all FGP functions without removing their hand from the joystick control. Although the FGP is discussed herein as a component of an aircraft, the configurations and algorithms described for operation of the FGP may be applicable to other vehicles, such as submarines or automobiles.

Figure 1:
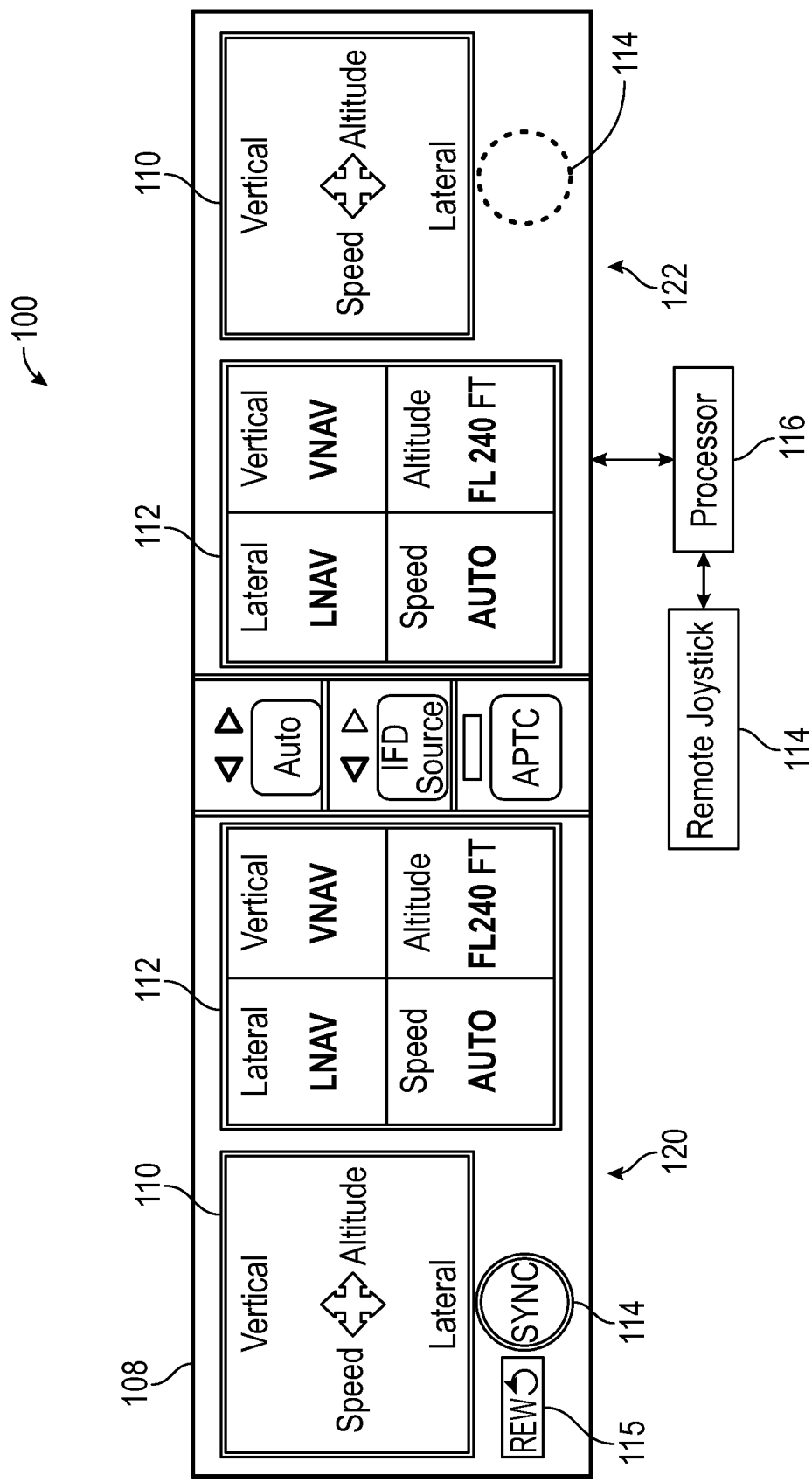
FIG. 1 is a simplified view illustrating a non-limiting embodiment of a flight guidance panel in accordance with the teachings of the present disclosure.

FIG. 1 is schematic view illustrating a non-limiting embodiment of a flight guidance panel (FGP) 100 in accordance with teachings of the present disclosure. FGP 100 includes a housing 108, two label displays 110, two subpanel displays 112, at least two joysticks 114, a return button 115, and a processor 116. FGP 100 and various components of FGP 100 may be in a top-level state or in a subpanel control state, as will become apparent below. Label displays 110 and subpanel displays 112 may be separate physical devices or may be separately defined display portions of a single physical device screen.

Housing 108 is an electronics enclosure in which components of FGP 100 are mounted. For example, label displays 110 and subpanel displays 112 are mounted to a front face of housing 108. In the example provided, return buttons 115, processor 116, and one of joysticks 114 are mounted in housing 108. It should be appreciated that return buttons 115, processor 116, and joysticks 114 may be remotely located within a flight deck of the aircraft in which FGP 100 is installed.

Label display 110 shows what will happen in response to deflection of joystick 114. In the top-level state illustrated in FIG. 1, label display 110 shows what guidance subpanel will be controlled in response to the corresponding deflection. It should be appreciated that the guidance controlled by any particular deflection may vary by implementation. In the example provided, label display 110 is also touch capable to perform the functions labeled by touching the corresponding display area on label display 110.

In the example provided, deflection of joystick 114 upward while label display 110 and subpanel display 112 are in the top-level state will change label display 110 and subpanel display 112 to a vertical guidance subpanel control state. Deflection of joystick 114 downward while label display 110 and subpanel display 112 are in the top-level state will change label display 110 and subpanel display 112 to a lateral guidance subpanel control state. As used herein, the term "upward" includes a forward deflection when joystick 114 is mounted to a horizontal surface, such as an armrest. Similarly, the term "downward" includes a backward deflection toward the user when joystick 114 is mounted to the horizontal surface.

Also in the example provided, deflection of joystick 114 to the left while label display 110 and subpanel display 112 are in the top-level state will change label display 110 and subpanel display 112 to a speed guidance subpanel control state. Deflection of joystick 114 to the right while label display 110 and subpanel display 112 are in the top-level state will change label display 110 and subpanel display 112 to an altitude guidance subpanel control state.

When label display 110 and subpanel display 112 are in some subpanel control states, a left deflection and a right deflection of joystick 114 will change unit types of the flight value goals for some subpanel types. For example, a left deflection of joystick 114 changes units to knots and a right deflection of joystick 114 changes units to Mach while subpanel display 112 is in the speed guidance subpanel control state. A left deflection of joystick 114 changes units to feet and a right deflection of joystick 114 changes units to meters while subpanel display 112 is in the altitude guidance subpanel control state. In some embodiments, different deflection directions control unit types.

While subpanel display 112 is in the subpanel control state an upward deflection of the joystick will engage automated control of the aircraft according to the flight value goals. A downward deflection of the joystick while the subpanel display is in the subpanel control state will disengage automated control for manual control of the aircraft relative to the flight value goals.

Figure 3:
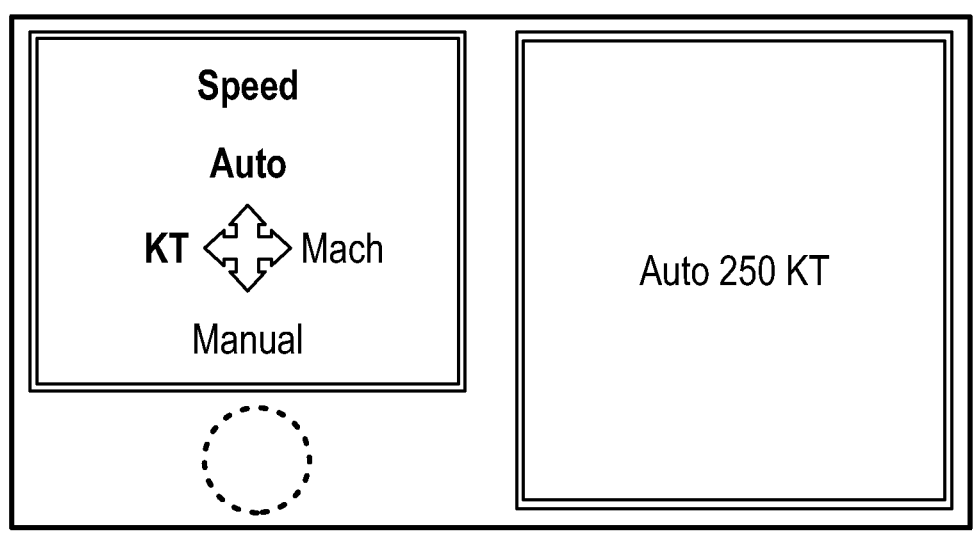
FIGS. 3-7 are simplified views illustrating various states of the displays of the flight guidance panel of FIG. 1 in an aircraft in accordance with the teachings of the present disclosure.
Figure 4:
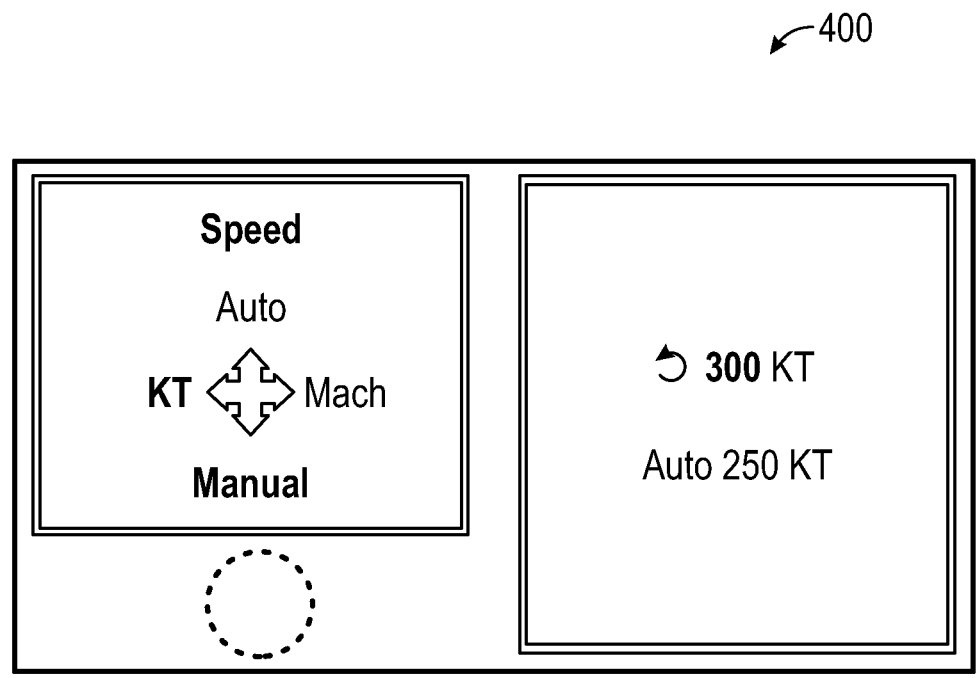
Figure 5:
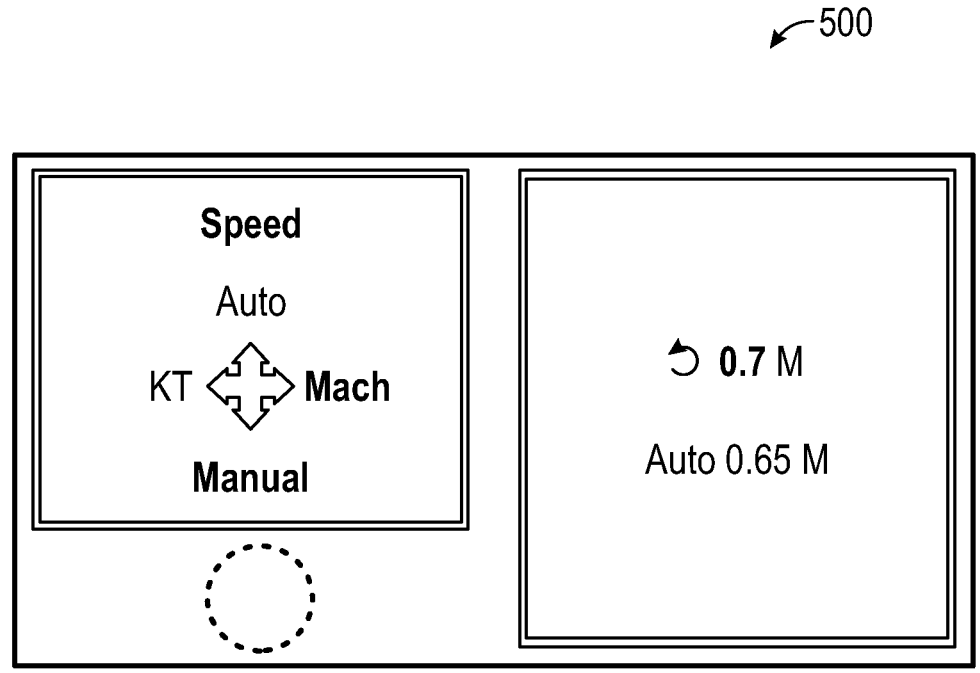

Subpanel display 112 shows a status of all four subpanel types and modes while in the top-level state as illustrated in FIG. 1. Subpanel display 112 changes to the corresponding subpanel control state in response to deflection of joystick 114 while subpanel display 112 is in the top-level state, as illustrated in FIGS. 3-5 for the speed subpanel control type.

Figure 2:
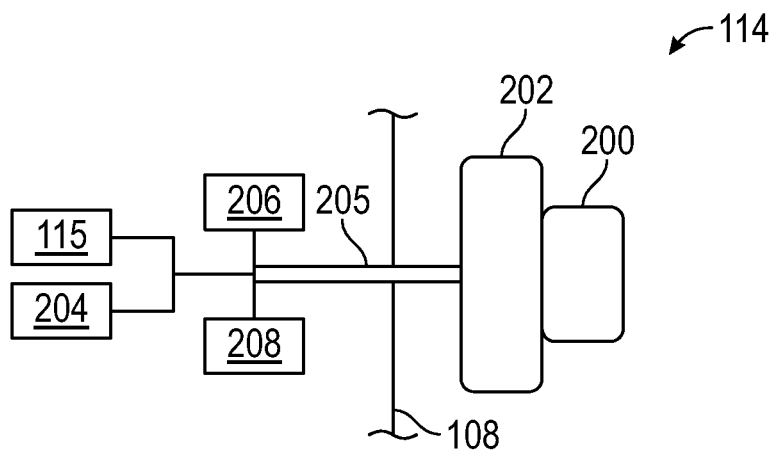
FIG. 2 is a side view illustrating a joystick of the flight guidance panel of FIG. 1 in accordance with the teachings of the present disclosure.

Referring now to FIG. 2, and with continued reference to FIG. 1, a joystick 114 with an integrated return button 115 is illustrated. As will be discussed below, return button 115 may be dedicated or may be integrated with joystick 114. Joystick 114 includes a first rotatable component 200, a second rotatable component 202, a first rotary encoder 204, a second rotary encoder 206, a deflection sensor 208, and integrated return button 115.

First rotatable component 200 and second rotatable component 202 are independently rotatable to increase or decrease the flight value goals by different increments. For example, rotation of first rotatable component 200 may increase or decrease flight value goals by 10 per detected rotation interval, whereas rotation of second rotatable component 202 may increase or decrease flight value goals by 100 per detected rotation interval. The increments vary by implementation and subpanel type.

First rotary encoder 204 is operatively coupled with first rotatable component 200 and second rotary encoder 206 is operatively coupled with second rotatable component 202. For example, first rotary encoder 204 may be coupled to an outer shaft 205 that is rotatably fixed to second rotatable component 202. Second rotary encoder 206 may be coupled to an inner shaft (not illustrated) that is rotatably fixed to first rotatable component 200.

Rotary encoders 204 and 206 detect rotation of rotatable components 200 and 202 and send signals indicating the rotation to processor 116. Rotation of first rotational component 200 rotates the inner shaft coupled to first rotary encoder 204. First rotary encoder 204 sends a signal indicating the rotation inputs to processor 116. Similarly, rotation of second rotational component 202 rotates outer shaft 205 coupled to second rotary encoder 206. Second rotary encoder 206 sends a signal indicating the rotation inputs to processor 116. Processor 116 changes the flight value goals in response to receiving the rotation inputs while the subpanel display is in the subpanel control state.

In some embodiments, only one rotatable component is utilized. Processor 116 may be further programmed to change the flight value goals in increments that are based on a speed of rotation of the rotatable components in addition to or as a replacement for the separate increment-based adjustments.

In the example provided, a first joystick 114 and a dedicated return button 115 are mounted in housing 108 on a pilot side 120 of FGP 100 closest to a pilot seat when installed in an aircraft. A second joystick 114 and integrated return button 115 are mounted in housing 108 on a co-pilot side 122 of FGP 100 closest to a co-pilot seat when installed in the aircraft. A third joystick 114 and integrated return button 115 are remotely located in an armrest of a pilot seat in the aircraft. Joystick 114 is sized to be gripped by the index finger, middle finger, and or thumb of a crew member for deflection and rotation. Joystick 114 may also be deflected using a thumb of the user. As used herein, the term "joystick" specifically excludes devices designed to be grasped by a hand with a palm in contact with the device.

In some embodiments, different numbers of joysticks 114 in different location combinations are implemented. For example, some embodiments have two joysticks 114 and two dedicated return buttons 115 located in housing 108 with no remotely located joystick 114. Some embodiments have two remotely located joysticks 114 with integrated or dedicated return buttons 115 and no joysticks 114 disposed within housing 108. Some embodiments have two joysticks 114 with dedicated or integrated return buttons 115 disposed in housing 108 and two joysticks 114 with dedicated or integrated return buttons 115 remotely located.

Deflection sensor 208 is coupled with joystick 114 to detect a deflection input from a user of the joystick. For example, shaft 205 may pivot at a panel side of joystick 114 near housing 108 when a user applies forces within the plane of FIG. 1 on rotatable components 200 and/or 202. Deflection sensor 208 detects at least four separate directions of deflection.

Return button 115 is used to change the state of subpanel display 112 and label display 110 to the top-level state in response to receiving the return input while subpanel display 112 and label display 110 are in the subpanel control state. Where return button 115 is integrated with joystick 114, return button may be actuated by pressing joystick 114 toward housing 108 along the longitudinal axis of joystick 114. Where return button 115 is separate from joystick 114, return button 115 and is disposed adjacent to joystick 114 for actuation by a thumb of the user gripping the joystick with fingertips.

Processor 116 or controller 116 is a hardware device that carries out instructions of a computer program to perform the functions of FGP 100. Processor 116 is a specific purpose computer configured to execute the computer program to provide the functions described herein. Processor 116 includes one or more memory units that store electronic data and computer programs. For example, the memory units may be flash memory, spin-transfer torque random access memory (STT-RAM), magnetic memory, phase-change memory (PCM), dynamic random access memory (DRAM), or other suitable electronic storage media. In the example provided, the memory units store control logic with instructions that cooperate with instruction processing hardware to perform operations of the method described below. In some embodiments, the processor may include one or more central processing units ("CPUs"), a microprocessor, an application specific integrated circuit ("ASIC"), a microcontroller, Field Programmable Gate Array (FGPA), and/or other suitable device. Furthermore, processor 116 may utilize multiple hardware devices as is also appreciated by those skilled in the art.

Processor 116 is configured to provide the functions associated with a flight guidance panel in addition to the specific features described below. In general, processor 116 coordinates inputs from joystick 114 and return button 115 to provide the functions of a flight guidance panel.

Referring now to FIGS. 3-7, and with continued reference to FIGS. 1-2, an example of navigating states of FGP 100 and using joystick 114 is illustrated. The top-level state is illustrated in FIG. 1 on subpanel display 112 and label display 110. In response to deflection of joystick 114 to the left from the state of FIG. 1, processor 116 transitions label display 110 and subpanel display 112 into state 300 illustrated in FIG. 3.

State 300 depicts the speed subpanel control state. The modes, functions, and flight goal values for the speed subpanel are now ready to be manipulated. In the example provided, autopilot speed control is currently engaged at 250 knots.

In response to a downward deflection of joystick 114, processor 116 transitions FGP 100 from state 300 to state 400 illustrated in FIG. 4. In state 400, label display 110 and subpanel display 112 are still in the speed subpanel control state, but processor 116 has disengaged autopilot speed control in response to the downward deflection of joystick 114. Accordingly, the aircraft is under manual speed control.

In response to a rightward deflection of joystick 114, processor 116 transitions FGP 100 from state 400 to state 500 illustrated in FIG. 5. In state 500, label display 110 and subpanel display 112 are still in the speed subpanel control state. The rightward deflection changes the displayed speed units from knots to Mach. Accordingly, the speed value displayed in subpanel display 112 is now in units of Mach.

Figure 6:
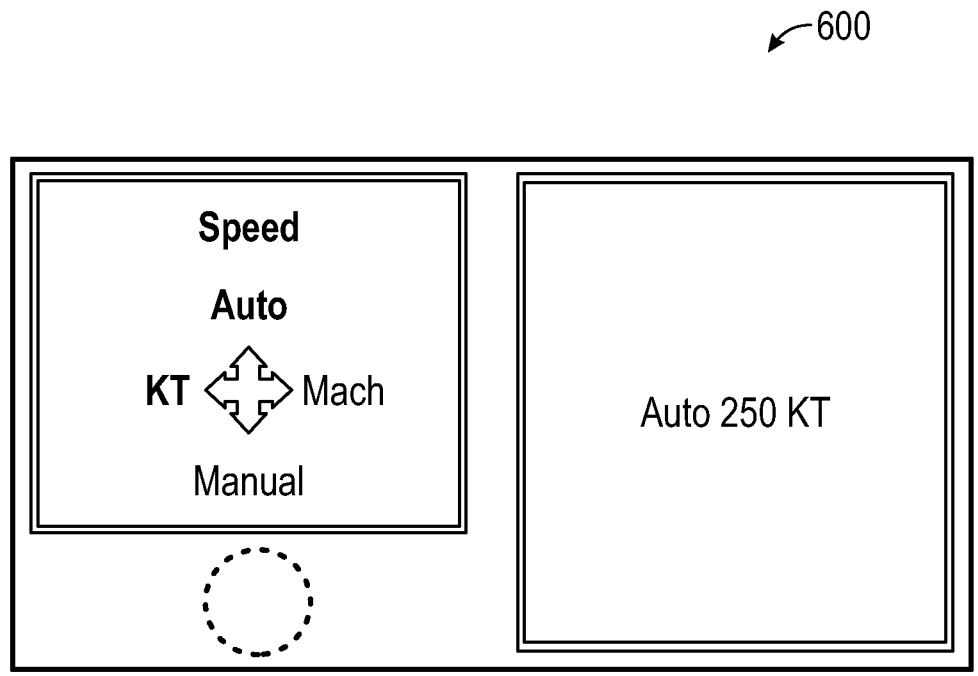
Figure 7:
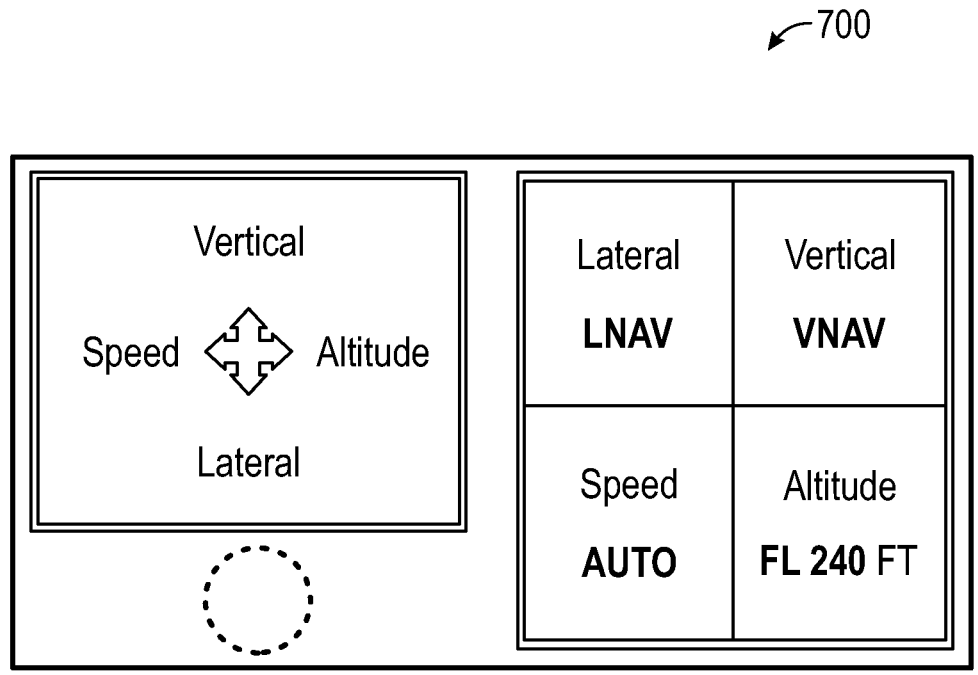

In response to an up and left deflection of joystick 114, processor 116 transitions FGP 100 from state 500 to state 600 illustrated in FIG. 6. In state 600, label display 110 and subpanel display 112 are still in the speed subpanel control state. In the example provided, a single deflection of joystick 114 registers both the upward and the leftward deflection. In some embodiments, individual precise deflections may be required. The upward deflection engages autopilot speed control and the leftward deflection changes the displayed speed units from Mach to knots.

In response to pressing in on joystick 114, integrated return button 115 sends a signal to processor 116. Processor 116 transitions FGP 100 from state 600 to state 700 illustrated in FIG. 7. State 700 is similar to the initial state illustrated in FIG. 1, where label display 110 and subpanel display 112 are in the top-level state. Accordingly, speed controls are not manipulated by deflections or rotations of joystick 114 unless the speed control subpanel is again entered by a leftward deflection from state 700. Similarly, the vertical, altitude, and lateral control subpanels may now be entered by upward, rightwards, and downward deflections, respectively, of joystick 114.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A flight guidance panel for an aircraft, the flight guidance panel comprising:
   a subpanel display for indicating different aircraft guidance modes and corresponding flight value goals, the subpanel display having a top-level state and a subpanel control state;
   a joystick for user interaction with the subpanel display;
   at least one rotary encoder coupled with the joystick to receive rotation inputs from a user of the joystick;
   a deflection sensor coupled with the joystick to detect a deflection input from the user of the joystick; and
   a processor programmed to:
      change a state of the subpanel display to the subpanel control state corresponding to a selected subpanel in response to receiving the deflection input while the subpanel display is in the top-level state; and
      change the status of an aircraft guidance mode controlled by the selected subpanel in response to receiving the rotation inputs while the subpanel display is in the subpanel control state.

2. The flight guidance panel of claim 1, further comprising a return button for inputting a return input, and wherein the processor is further programmed to change the state of the subpanel display to the top-level state in response to receiving the return input while the subpanel display is in the subpanel control state.

3. The flight guidance panel of claim 2, wherein the return button is coupled with the joystick and actuated by pressing the joystick along a longitudinal axis of the joystick.

4. The flight guidance panel of claim 2, wherein the return button is separate from the joystick and is disposed adjacent to the joystick for actuation by the user while gripping the joystick.

5. The flight guidance panel of claim 1, wherein the joystick includes at least two independently rotatable components, and wherein the processor is further programmed to change the status by a first increment in response to rotation of a first of the at least two independently rotatable components and to change the status by a second increment in response to rotation of a second of the at least two independently rotatable components.

6. The flight guidance panel of claim 1, wherein the processor is further programmed to change the status in increments that are based on a speed of rotation of the joystick.

7. The flight guidance panel of claim 1, further comprising:
   a housing in which the subpanel display is mounted;
   a second subpanel display mounted in the housing; and
   a second joystick for user interaction with the second subpanel display.

8. The flight guidance panel of claim 7, wherein the joystick is mounted in the housing on a pilot side of the flight guidance panel, and wherein the second joystick is mounted in the housing on a co-pilot side of the flight guidance panel.

9. The flight guidance panel of claim 7, wherein the joystick and the second joystick are remotely located separate from the housing.

10. The flight guidance panel of claim 9, wherein the joystick is configured to be mounted in an armrest of a pilot seat and the second joystick is configured to be mounted in an armrest of a co-pilot seat in a flight deck of the aircraft.

11. The flight guidance panel of claim 1, wherein the joystick is configured to be actuated by fingers of the user.

12. The flight guidance panel of claim 1, wherein the processor is further programmed to:
   change the subpanel display to a vertical guidance subpanel control state in response to deflection of the joystick upward while the subpanel display is in the top-level state; and
   change the subpanel display to a lateral guidance subpanel control state in response to deflection of the joystick downward while the subpanel display is in the top-level state.

13. The flight guidance panel of claim 12, wherein the processor is further programmed to:
   change the subpanel display to a speed guidance subpanel control state in response to deflection of the joystick to the left while the subpanel display is in the top-level state; and
   change the subpanel display to an altitude guidance subpanel control state in response to deflection of the joystick to the right while the subpanel display is in the top-level state.

14. The flight guidance panel of claim 1, wherein the processor is further programmed to:
   engage automated control of the aircraft according to the status in response to an upward deflection of the joystick while the subpanel display is in the subpanel control state; and
   disengage automated control for manual control of the aircraft relative to the status in response to a downward deflection of the joystick while the subpanel display is in the subpanel control state.

15. An aircraft, comprising:
   a flight guidance panel comprising:
      a subpanel display for indicating different aircraft guidance modes and corresponding flight value goals, the subpanel display having a top-level state and a subpanel control state;
      a joystick for user interaction with the subpanel display;
      at least one rotary encoder coupled with the joystick to receive rotation inputs from a user of the joystick; and
      a deflection sensor coupled with the joystick to detect a deflection input from the user of the joystick; and
   a processor programmed to:
      change a state of the subpanel display to the subpanel control state corresponding to a selected subpanel in response to receiving the deflection input while the subpanel display is in the top-level state; and
      change the status of an aircraft guidance mode controlled by the selected subpanel in response to receiving the rotation inputs while the subpanel display is in the subpanel control state.

16. The aircraft of claim 15, further comprising a pilot seat having an armrest, wherein the joystick is disposed in the armrest of the pilot seat.

17. The aircraft of claim 15, wherein the flight guidance panel further includes a return button for inputting a return input, and wherein the processor is further programmed to change the state of the subpanel display to the top-level state in response to receiving the return input while the subpanel display is in the subpanel control state.

18. The aircraft of claim 17, wherein the return button is coupled with the joystick and actuated by pressing the joystick along a longitudinal axis of the joystick.

19. The aircraft of claim 1, wherein the joystick includes at least two independently rotatable components, and wherein the processor is further programmed to change the status by a first increment in response to rotation of a first of the at least two independently rotatable components and to change the status by a second increment in response to rotation of a second of the at least two independently rotatable components.

20. The aircraft of claim 1, wherein the processor is further programmed to:
- change the subpanel display to a vertical guidance subpanel control state in response to deflection of the joystick upward while the subpanel display is in the top-level state;
- change the subpanel display to a lateral guidance subpanel control state in response to deflection of the joystick downward while the subpanel display is in the top-level state;
- change the subpanel display to a speed guidance subpanel control state in response to deflection of the joystick to the left while the subpanel display is in the top-level state;
- change the subpanel display to an altitude guidance subpanel control state in response to deflection of the joystick to the right while the subpanel display is in the top-level state;
- engage automated control of the aircraft according to the status in response to an upward deflection of the joystick while the subpanel display is in the subpanel control state; and
- disengage automated control for manual control of the aircraft relative to the status in response to a downward deflection of the joystick while the subpanel display is in the subpanel control state.

\* \* \* \* \*